(12) United States Patent
Hwang

(10) Patent No.: US 11,915,372 B2
(45) Date of Patent: Feb. 27, 2024

(54) METHOD AND 3D MODELING ENGINE FOR MANAGING MODELING DATA DURING 3D MODELING

(71) Applicant: UMODELER, INC., Seoul (KR)

(72) Inventor: Jae Sik Hwang, Gyeonggi-do (KR)

(73) Assignee: UMODELER, INC., Seoul (KR)

( * ) Notice: Subject to any disclaimer, the term of this patent is extended or adjusted under 35 U.S.C. 154(b) by 0 days.

(21) Appl. No.: 17/659,497

(22) Filed: Apr. 18, 2022

(65) Prior Publication Data

US 2022/0392161 A1 Dec. 8, 2022

(30) Foreign Application Priority Data

May 31, 2021 (KR) .................. 10-2021-0070309

(51) Int. Cl.
*G06T 17/20* (2006.01)
*G06F 16/532* (2019.01)

(52) U.S. Cl.
CPC ............ *G06T 17/20* (2013.01); *G06F 16/532* (2019.01)

(58) Field of Classification Search
None
See application file for complete search history.

(56) References Cited

U.S. PATENT DOCUMENTS

| | | | | |
|---|---|---|---|---|
| 5,644,688 A * | 7/1997 | Leon | ................. | G06T 17/20 703/2 |
| 5,734,383 A * | 3/1998 | Akimichi | ................ | G06T 17/10 345/420 |
| 5,768,156 A * | 6/1998 | Tautges | ................... | G06T 17/20 703/2 |
| 5,886,702 A * | 3/1999 | Migdal | ................... | G06T 17/20 345/423 |
| 6,112,133 A * | 8/2000 | Fishman | ......... | G05B 19/40937 708/130 |
| 6,314,205 B1 * | 11/2001 | Masuda | ................. | G06T 17/20 382/232 |
| 2008/0297503 A1 * | 12/2008 | Dickinson | ............. | G06T 17/10 345/420 |
| 2009/0271156 A1 * | 10/2009 | Kageura | ................ | G06F 30/23 703/1 |
| 2010/0238166 A1 * | 9/2010 | Tamstorf | ........... | G06V 30/1988 382/218 |
| 2011/0199382 A1 * | 8/2011 | Huang | .................... | G06T 9/001 345/467 |
| 2015/0002510 A1 * | 1/2015 | Takayama | ............ | G06T 17/205 345/423 |
| 2015/0145863 A1 * | 5/2015 | Buron | .................... | G06T 15/10 345/423 |
| 2020/0211281 A1 * | 7/2020 | Randon | ................ | G06T 17/005 |

OTHER PUBLICATIONS

Blender, Source/Modeling/BMesh/Design, Dec. 23, 2019 [online][retrieved from https://wiki.blender.org/wiki/Source/Modeling/BMesh/Design] [retrieved on Apr. 13, 2023 12:50:24 PM] (Year: 2019).*

* cited by examiner

*Primary Examiner* — Sultana M Zalalee
(74) *Attorney, Agent, or Firm* — Mark T. Vogelbacker; Eckert Seamans Cherin & Mellott, LLC

(57) ABSTRACT

A method and three-dimensional (3D) modeling engine for managing modeling data during 3D modeling includes generating, by an editable mesh module, a data search list. The method and engine further includes searching, by the editable mesh module, for connection information of vertices, edges, and faces of a 3D model on the basis of the data search list.

6 Claims, 13 Drawing Sheets

LOOP CYCLE LIST

RADIAL CYCLE LIST

LOOP CYCLE LIST

METHOD AND 3D MODELING ENGINE FOR MANAGING MODELING DATA DURING 3D MODELING

CROSS-REFERENCE TO RELATED APPLICATION

This application claims priority to and the benefit of Korean Patent Application No. 10-2021-0070309, filed on May 31, 2021, the disclosure of which is incorporated herein by reference in its entirety.

BACKGROUND

1. Field of the Invention

The present invention relates to a three-dimensional (3D) modeling data management method and a device for performing the same. More specifically, the present invention relates to a 3D modeling data management method for facilitating a user's 3D modeling and a device for performing the same.

2. Discussion of Related Art

The global game market is estimated to be worth 180 trillion KRW, and more than 50% of all mobile games and more than 25% of Steam games are produced using the Unity engine or the Unreal engine. Furthermore, with the rapid development of real-time graphics technology, these engines are being actively used not only in games but also in various fields, such as manufacturing, film, animation, architecture, etc.

However, existing modeling tools for the Unity and Unreal engines are not very complete and are limited to prototyping. Three-dimensional (3D) modeling tools, such as 3ds Max, Maya, etc., which are frequently used in the game, film, and animation fields are intended for experts and thus are not easy to learn. Also, the 3D modeling tools are separate programs, and thus there are many inconveniences in data interoperation with a game engine. In addition, a modeling technique of the existing 3D modeling tools cannot be directly used in content development.

Therefore, to solve these problems, it is necessary to develop a 3D modeling solution optimized for creating real-time rendering content. Also, it is necessary to develop a next-generation 3D modeling tool that can solve the problem of data export and import caused when an existing external modeling tool, such as 3ds Max, Maya, etc., is used and can enable anyone to easily perform low polygon modeling up to high polygon modeling in a game engine.

SUMMARY OF THE INVENTION

The present invention is directed to solving all the above-described problems.

The present invention is also directed to providing a three-dimensional (3D) modeling tool that is optimized for real-time rendering content creation through effective 3D modeling data management.

The present invention is also directed to providing a next-generation 3D modeling tool that solves, through effective 3D modeling data management, the problem of data export and import caused when an external modeling tool is used and enables anyone to easily perform low polygon modeling up to high polygon modeling in a game engine.

The technical objectives of the present invention are not limited to the above, and other objectives may become apparent to those of ordinary skill in the art based on the following descriptions.

Representative configurations of the present invention for achieving the above object are as follows.

According to an aspect of the present invention, there is provided a method of managing modeling data during three-dimensional (3D) modeling, the method comprising: generating, by an editable mesh module, a data search list; and searching, by the editable mesh module, for connection information of vertices, edges, and faces of a 3D model on the basis of the data search list.

The data search list includes a disk cycle list, a radial cycle list, and/or a loop cycle list, the disk cycle list is a list for circulating around the edges connected to the vertex, the radial cycle list is a list for circulating around the faces including the edge, and the loop cycle list is a list for circulating around the loops constituting the faces.

The editable mesh module manages at least one hole in the face on the editable mesh in a data structure of the loop cycle list, a loop corresponding to each of the at least one hole references a loop of an adjacent hole with directionality, and when the loop corresponding to each of the at least one hole in the face is sequentially circulated around, information on the at least one hole in the face is represented.

According to another aspect of the present invention, there is provided a three-dimensional (3D) modeling engine for managing modeling data during 3D modeling, the 3D modeling engine comprising: an editable mesh module configured to generate a data search list and search for connection information of vertices, edges, and faces of a 3D model on the basis of the data search list; and a builder configured to divide the editable mesh into triangular faces and generate a renderable mesh.

The data search list includes a disk cycle list, a radial cycle list, and/or a loop cycle list, the disk cycle list is a list for circulating around the edges connected to the vertex, the radial cycle list is a list for circulating around the faces including the edge, and the loop cycle list is a list for circulating around the loops constituting the faces.

The editable mesh module manages at least one hole in the face on the editable mesh in a data structure of the loop cycle list, a loop corresponding to each of the at least one hole references a loop of an adjacent hole with directionality, and when the loop corresponding to each of the at least one hole in the face is sequentially circulated around, information on the at least one hole in

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
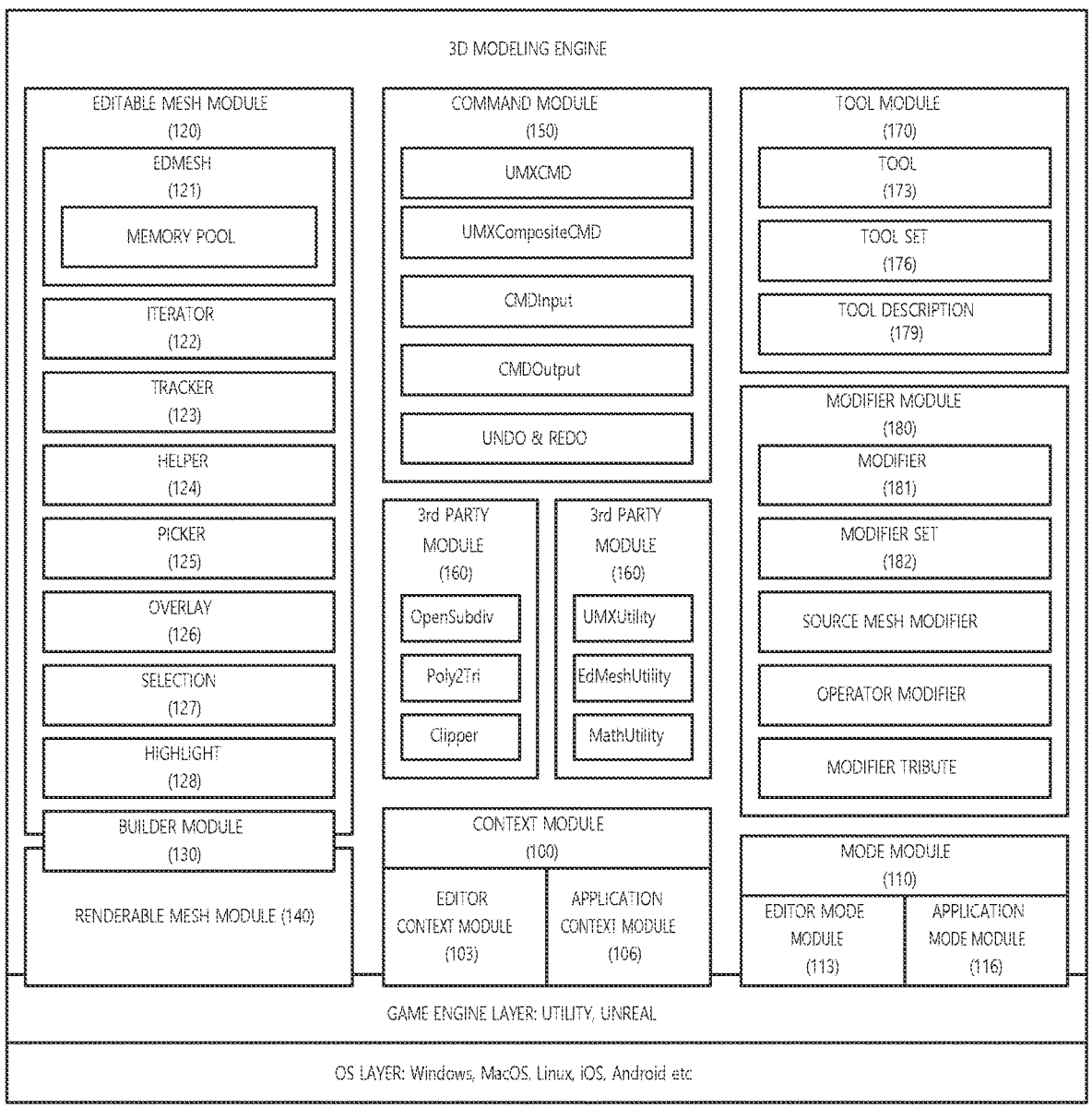
FIG. 1 is a conceptual diagram showing a three-dimensional (3D) modeling engine according to an exemplary embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, various exemplary embodiments of the present invention will be described in detail with reference to the accompanying drawings in order to enable those skilled in the art to easily practice the present invention.

FIG. 1 is a conceptual diagram showing a three-dimensional (3D) modeling engine according to an exemplary embodiment of the present invention.

Referring to FIG. 1, the 3D modeling engine may be positioned at a higher layer than an operating system (OS) layer and a game engine layer.

The 3D modeling engine may include a context module 100, a mode module 110, an editable mesh (EdMesh) module 120, a builder module 130, a renderable mesh module 140, a command module 150, a 3$^{rd}$ party module 160, a utility module 165, a tool module 170, and modifier modules 180.

The 3D modeling engine according to the exemplary embodiment of the present invention may operate as an editor plugin of the Unity engine and the Unreal engine and also operate in the same way in any form of application created in the Unity or Unreal engine. The context module 100 may include an editor context module 103 and an application context module 106. The context module 100 may be implemented for processing related to game engine context and 3D modeling engine context.

The game engine context processing of the context module 100 may be a process for a subordinate request of a game engine. Also, the game engine content processing may include a process of returning a result of the request and a process related to a camera, a screen, and data input or output. Also, the game engine context processing of the context module 100 may include a process of inheriting a 3D modeling engine context class for each editor and application based on the 3D modeling engine and redefining a method to fit the corresponding context.

The 3D modeling engine context processing of the context module 100 may include a return process upon a request with information related to an object that is currently activated and edited. Information and the like on an EdMesh, a selection, a modifier module, and a tool module related to an object, which is activated through the 3D modeling engine context processing of the context module 100, may be acquired, and the acquired information may be stored in a context module.

The mode module 110 may be implemented to process event information by transmitting the event information to the 3D modeling engine when an event occurs in the game engine. The mode module 110 may include an editor mode module 113 and an application mode module 116 that are implemented to fit the 3D modeling engine and the context of each application.

Events that generate event information may include an input event (a keyboard, a mouse, a touchscreen, etc.), an output event (called at the timing of an output on the screen), and an update event (called every tick).

The EdMesh module 120 may be implemented for real-time editing of high-capacity 3D meshes.

As subordinate modules, the EdMesh module 120 may include an EdMesh 121, an iterator 122, a tracker 123, a helper 124, a picker 125, an overlay 126, a selection 127, and a highlight 128.

The EdMesh 121 may be implemented to efficiently manage vertices, edges, and faces, which are basic elements constituting a mesh, using a connectivity cycle mesh structure.

The iterator 122 and the tracker 123 may be implemented to easily circulate around each element.

The helper 124 may be implemented to facilitate manipulation of vertices, edges, and faces.

The overlay 126 may be implemented to rapidly visualize tens to hundreds of thousands of vertices, edges, and faces.

The picker 125 may be implemented to rapidly select high-capacity elements.

The selection 127 may be implemented to efficiently manage a last selected element.

The highlight 128 may be implemented to manage an element indicated by a cursor.

Detailed functions of the EdMesh module 120 will be described below.

The builder module 130 may be implemented to convert an EdMesh generated on the basis of the EdMesh module 120 into a renderable mesh and transmit the renderable mesh to the renderable mesh module 140. The builder module 130 may convert EdMesh data into renderable mesh data which is an actually renderable data format. Specifically, the builder module 130 may convert geometry data of an EdMesh into a renderable mesh form.

According to an exemplary embodiment of the present invention, EdMeshes may have faces in concave polygon shapes as well as convex hull shapes and may also process polygons with holes. However, such a polygon-shaped face is not directly renderable, and thus a process of converting the polygon-shaped face into triangular polygons which is a renderable form may be performed in the builder module 130. In the case of an existing 3D modeling engine, it is difficult to process convex hulls, concave polygon-shaped faces, and polygons with holes. However, in the present invention, such various shapes of 3D models can be processed on the basis of the EdMesh module 120, the builder module 130, and the renderable mesh module 140.

Detailed operations of the builder module 130 will be described below.

The renderable mesh module 140 may store renderable mesh data received from the builder module 130.

The command module 150 may be obtained by modulating various methods of manipulating EdMeshes using a design pattern called command.

There are two methods of manipulating EdMeshes. The first manipulation method is directly calling a method provided by an EdMesh, and the second manipulation method is using a command.

To directly call and manipulate a method provided by an EdMesh, it is necessary to deeply understand the architecture of EdMeshes. Also, since the method of directly calling a method provided by an EdMesh does not support either undo or redo, it is necessary to manually implement a routine for restoring changes. Accordingly, the second manipulation method in which a command is used is necessary.

When the command method is used, many functions of handling EdMeshes can be easily modulated, and it is possible to restore an EdMesh to a state before or after a change by simply calling a function once. Also, the command method makes it possible to bundle a plurality of commands as one command and perform the commands as one unit.

A command can be used not only in manipulating an EdMesh but also in all routines that require undo and redo. For example, the command method may be used in changing a tool module or a modifier module.

The $3^{rd}$ party module 160 may be implemented to provide a library. The $3^{rd}$ party module 160 may provide OpenSubdiv which is a library developed by Pixar to subdivide geometry using hardware acceleration, Poly2tri which is a library triangulating a polygon without adding any vertex, Clipper which is a 2D Boolean operation library, etc.

The utility module 165 is a module in which utility functions that may be used overall in a 3D modeling engine are collected.

Unlike the modifier modules 180, the tool module 170 may be implemented to perform destructive modeling for directly deforming a mesh. The tool module 170 may include tools 173, tool sets 176, and a tool description 179 as subordinate modules.

A common interface is defined as the uppermost parent class of all tool classes above the tools 173, and a lower class which inherits the tools 173 overrides the common interface to implement a unique function.

Since the tools 173 may sense keyboard and mouse events occurring in an editor mode using an overridden method of a tool, it is possible to modify EdMeshes according to an input of a user. Such a modification of an EdMesh is made through a command object such that undo and redo are fundamentally allowed.

Metainformation of each of the tools 173 may be described through a tool description 179. The metainformation of each of the tools 173 may include an alias of the tool, a tooltip, an icon filename, a button name, a user interface (UI) button, the order of the tool among the tools 173 arranged as icons, etc. The metainformation of each of the tools 173 may be stored in a tool database and easily used.

The tool sets 176 make it possible to collect and use only desired tools. A tool configuration is changeable without limitation on the basis of the tool sets 176. In general, the modifier modules 180 have an instance of the tool sets 176. The tool sets 176 are each configured with tools required for the modifier modules 180. When one of the modifier modules 180 is selected, only tools in the tool set 176 of the corresponding modifier are activated and exposed, and thus a unique tool may be configured for each modifier.

The modifier modules 180 may be implemented for non-destructive modeling.

Information on modifiers 181 is stored in a modifier set 182 and may cause a modification in an upper modifier result. The modification caused by the modifiers 181 is affected by an order in which the modifiers 181 are stored in the modifier set 182. Accordingly, it is possible to change geometry without directly editing EdMeshes by simply changing the order of the modifiers 181 in the modifier set 182 or inserting, adding, or removing a new modifier 181.

In this way, it is possible to edit meshes without directly modifying original meshes while maintaining the shape of the original meshes. When the modifiers 181 are collapsed, a change applied up to the position of collapse may remain on meshes.

A processor (not shown) may be implemented to control operations of the context module 100, the mode module 110, the EdMesh module 120, the builder module 130, the renderable mesh module 140, the command module 150, the $3^{rd}$ party module 160, the utility module 165, the tool module 170, and the modifier modules 180.

Figure 2:
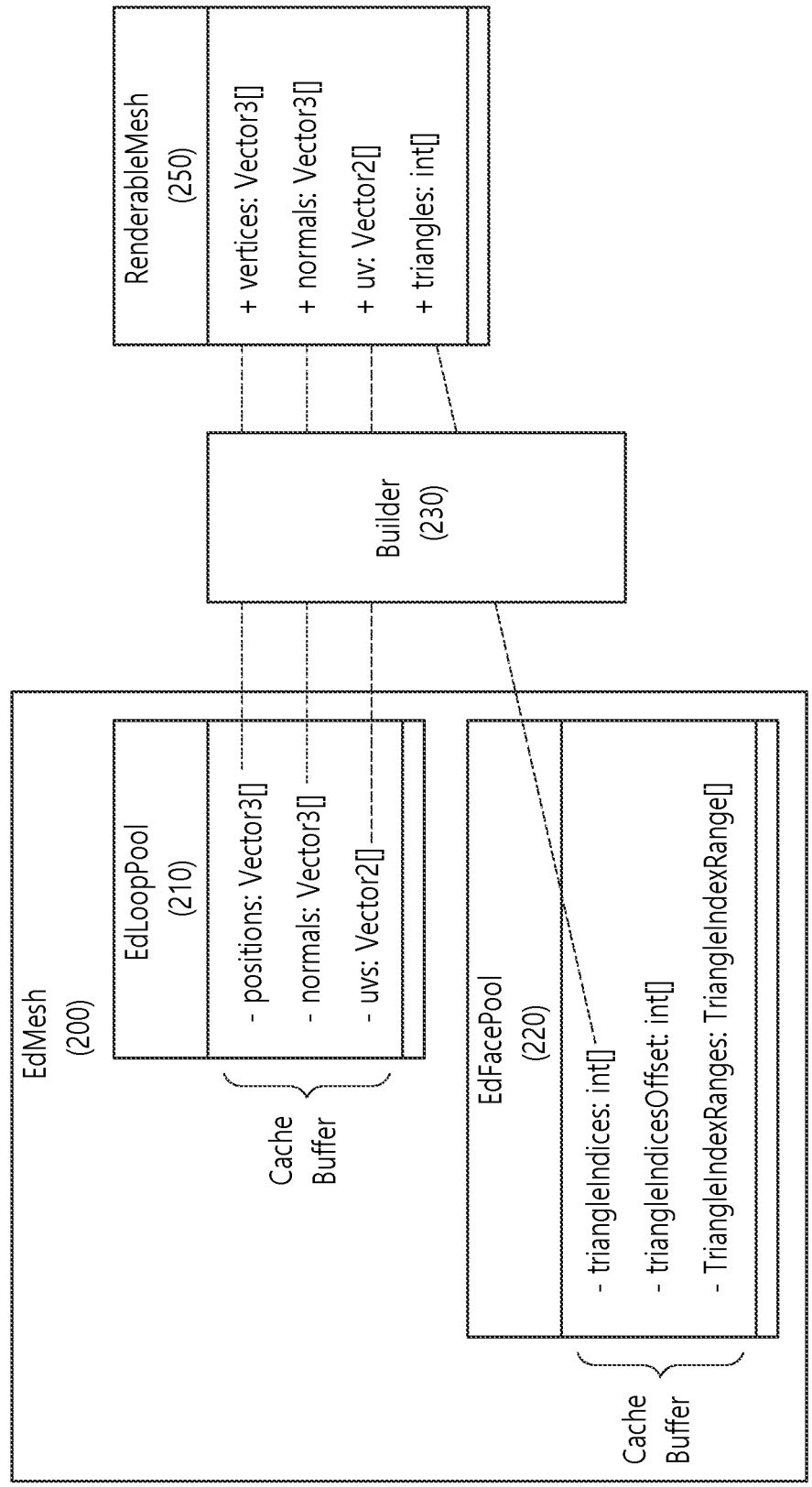
FIG. 2 is a conceptual diagram illustrating operations of a builder module according to an exemplary embodiment of the present invention.

FIG. 2 is a conceptual diagram illustrating operations of a builder module according to an exemplary embodiment of the present invention.

FIG. 2 illustrates operations of a builder module for converting an EdMesh into a renderable mesh.

Referring to FIG. 2, an EdMesh 200 may include elements, such as vertices, edges, loops, faces, etc., and may have a data structure optimized for editing. Information on the elements may be managed as a memory pool.

The EdMesh 200 has the structure that is optimized for editing but is not suitable for being displayed on a screen. Accordingly, it is necessary to generate a renderable mesh 250 which is a suitable data structure for rendering the EdMesh 200 on the screen.

In other words, the EdMesh 200 is capable of processing any form of polygons. However, it is necessary to divide a polygon into triangular faces and store the triangular faces in the renderable mesh 250 so that the polygon may be rendered. A builder 230 may generate the renderable mesh 250 by dividing the EdMesh 200 into triangular faces.

The EdMesh 200 may be generally modified by executing a command on a tool module which handles external event processing. The EdMesh 200 may be modified in various ways, such as adding a new vertex, edge, or face, removing an existing element, moving a vertex, etc.

In the case of a modification, it is necessary to distinguish between a case in which a vertex array or vertex connection structure is changed in the memory pool and the opposite case.

The case in which a vertex array or vertex connection structure is changed in the memory pool represents a topological change. A case in which no vertex array or vertex connection structure is changed in the memory pool (e.g., when the context of some vertices (e.g., positions of the vertices and the like) is changed) represents no topological change. Topology is a connection structure of vertices, edges, faces, etc., and is classified into a case in which a connection structure which is the topology is changed and a case in which a connection structure which is the topology is not changed.

Information on the renderable mesh 250 may be stored in a vertex buffer and an index buffer. The vertex buffer may include information on a vertex array related to vertex information, and the index buffer may include information on an index of the vertex array.

The builder 230 may use cache buffers 210 and 220 generated in advance in the EdMesh 200 to fill the vertex buffer and index buffer, which are buffers of the renderable mesh 250, on the basis of the EdMesh 200.

The cache buffer of the present invention may include a cache buffer of a loop memory pool (EdLoopPool) 210 and a cache buffer of a face memory pool (EdFacePool) 220.

The cache buffer of the loop memory pool (EdLoopPool) 210 may store an array of positions, normals, and UVs, and the cache buffer of the face memory pool (EdFacePool) 220 may store an array of triangle indices (triangleIndices).

The positions, the normals, and the UVs in the cache buffer of the loop memory pool (EdLoopPool) 210 may store information on an array of position, normal, and UV coordinates of vertices, respectively. TriangleIndices in the cache buffer of the face memory pool (EdFacePool) 220 may store information on a result of triangulating face polygons.

A loop which is an element constituting the EdMesh 200 is a data structure that contains information on identifiers (IDs) of vertices and edges constituting faces of a 3D model and even information on the directionalities of the faces. Accordingly, when a loop is circulated around, all vertices of a face may be referenced in sequence. In general, in the case of generating the renderable mesh 250, the renderable mesh 250 is processed in units of faces. Also, vertices of the renderable mesh 250 have attributes of normal and UV coordinates as well as position coordinates. Accordingly, when any one of the attributes is different between two vertices, the two vertices are processed as different vertices, and thus a cache vertex buffer size for rendering corresponding to the number of loops may be allocated.

When the EdMesh 200 is modified, some or all cache data stored in the loop memory pool (EdLoopPool) 210 and the face memory pool (EdFacePool) 220 may be updated.

To minimize performance degradation during an operation in which the builder 230 builds the renderable mesh 250 from the EdMesh 200, an array of positions, normals, and UVs may be directly allocated to the corresponding buffer of the renderable mesh 250 without any processing.

Also, during the operation in which the builder 230 builds the renderable mesh 250 from the EdMesh 200, face-specific triangulated indices may be copied from an array of triangleIndices to an array of triangles of the renderable mesh 250.

In this way, the builder 230 may rapidly change the EdMesh 200 to the renderable mesh 250.

Figure 3:
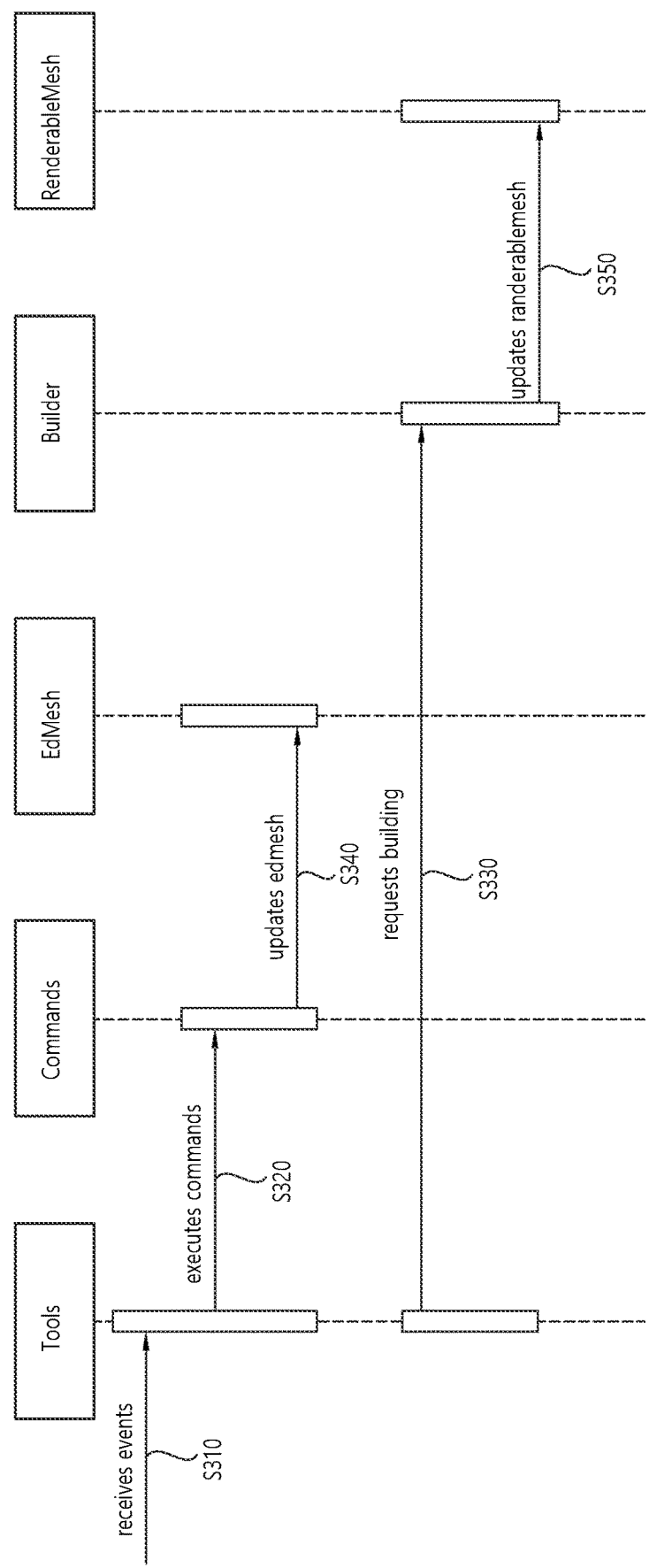
FIG. 3 is a conceptual diagram illustrating operations of a builder module according to an embodiment of the present invention.

FIG. 3 is a conceptual diagram illustrating operations of a builder module according to an embodiment of the present invention.

FIG. 3 shows a process in which change information of an EdMesh is updated into renderable mesh information on the basis of an external request.

Referring to FIG. 3, a tool module may receive event information (operation S310).

The tool module may perform destructive modeling for directly deforming a mesh. The tool module may receive event information for modeling for directly deforming a mesh.

The tool module may generate a command for modeling for directly deforming a mesh and transmit the command to a command module (operation S320). Also, the tool module may request a builder module to newly build a renderable mesh (operation S330).

The command module may request an EdMesh module to update an EdMesh (operation S340).

Specifically, the command module may receive the command for modeling for directly deforming a mesh from the tool module and request the EdMesh module to update the EdMesh. The EdMesh module may update an array of positions, normals, and UVs in a cache buffer of a loop memory pool (EdLoopPool) and an array of triangleIndices in a cache buffer of a face memory pool (EdFacePool) on the basis of the event information.

The builder module may request the renderable mesh module to update a renderable mesh on the basis of the building request received from the tool module (operation S350).

The renderable mesh module may update the renderable mesh corresponding to the event information on the basis of the event information.

Figure 4:
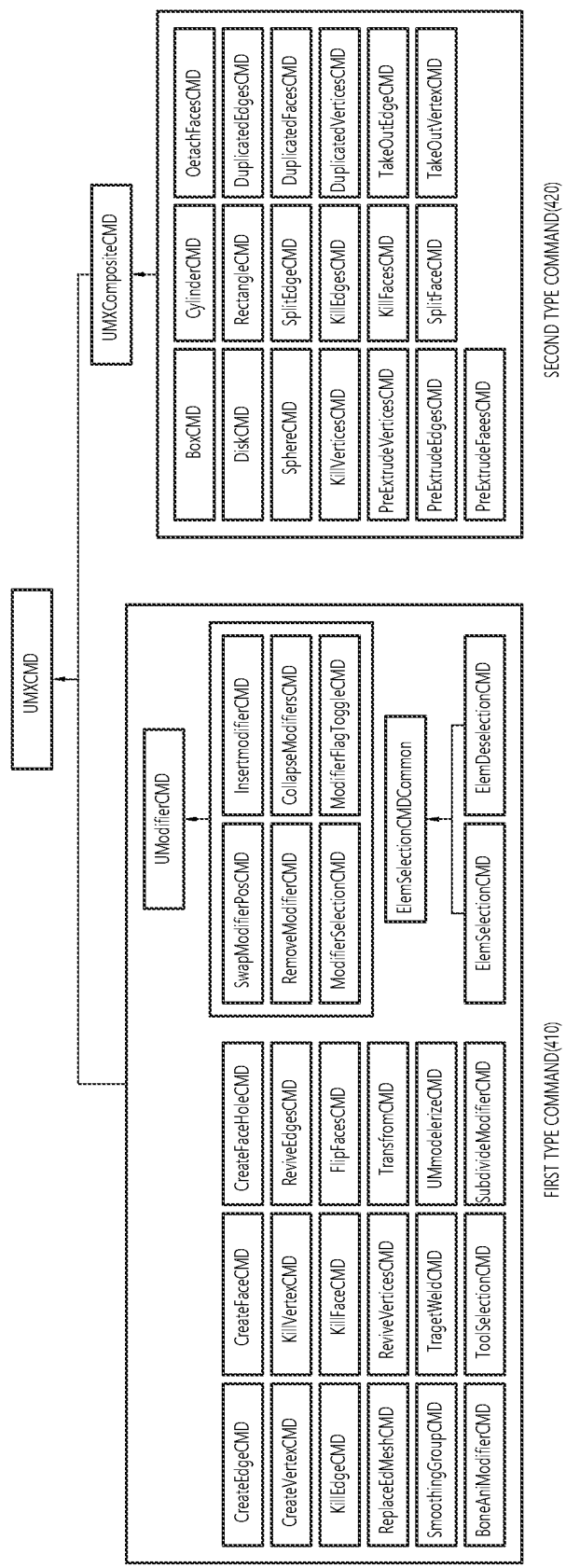
FIG. 4 is a conceptual diagram illustrating operations of a command module according to an exemplary embodiment of the present invention.

FIG. 4 is a conceptual diagram illustrating operations of a command module according to an exemplary embodiment of the present invention.

FIG. 4 shows operations of a command module for manipulating an EdMesh.

Referring to FIG. 4, there are generally two methods of manipulating an EdMesh. In the first method, a method provided by an EdMesh is directly called, and in the second method, a command is used.

As described above, to directly call and manipulate a method of an EdMesh, it is necessary to deeply understand the architecture of EdMeshes. Accordingly, it is difficult to use the first method without an expert. Also, since this method does not support either undo or redo, it is necessary to manually implement a routine for restoring changes.

To overcome these shortcomings, according to the present invention, an EdMesh can be manipulated on the basis of a command module. The command module is obtained by modularizing a design pattern called a command. Using a command can facilitate modularization of many functions for handling EdMeshes. Also, a process of restoring an EdMesh to a state before or after a change can be simply performed by calling a function once. Further, a plurality of commands can be bundled as one command and performed as one unit.

In addition, a command can be used not only in manipulating an EdMesh but also in all routines that require undo and redo.

For example, the command method may be used for a change based on a tool module or modifier module.

FIG. 4 is a command class hierarchy diagram of a 3D modeling engine.

In general, commands are classified into the following two types.

Commands of a command module are non-combination commands and combination commands and may be classified into two types (first type commands 410 and second type commands 420).

First type commands 410: commands directly inherited from non-combination commands Second type commands 420: commands inherited from combination commands The first type commands 410 include concrete code for implementation, and the second type commands 420 include code about how to combine ready-made commands.

A command may generally include three actions, which may include execution, undo, and redo.

For the first type commands 410, a code for execution and undo may be manually written, and a code for redo may be replaced by the code for execution.

For the second type commands 420, only a code for execution is manually written. However, undo works by calling an undo function of each command while circulating around a combined command in reverse, and redo works by calling a redo function of each command in order of combination. Accordingly, the second type commands 420 may be generated without writing additional code.

The 3D modeling engine according to the exemplary embodiment of the present invention provides a special interface for conveniently using commands on the basis of a command module, thereby making it possible to generate and execute a command by only calling one function. Each command includes a create method in a static form and may call the create method to directly generate and use a command object. For example, CreateVertexCMD.Create( ) method may be used to generate and directly execute a command for generating a vertex at a specific position.

A command has at least one of a created state, an executed state, an undone state, and a redone state.

According to the above-described actions, a command may be created and then executed. After the command is executed, the command may be undone. After the command is undone, the command may be redone. After the command is redone, the command may be undone.

When a command is used in the 3D modeling engine according to the exemplary embodiment of the present invention, the following merits can be obtained.

A function to be executed can be encapsulated with a consistent interface. When any function is modularized as a class inheriting a command, the function can be executed by calling an execution method, and undo and redo can be immediately executed by calling undo and redo methods.

Also, a function to be executed can be stored as concrete data. Since the function is stored as a class object, it is possible to modularize not only input factors required for the function but also a portion for executing the function and a portion for undoing the function. Therefore, the function to be performed can be easily reused and serialized and thus can be stored and transmitted like data.

Figure 5A:
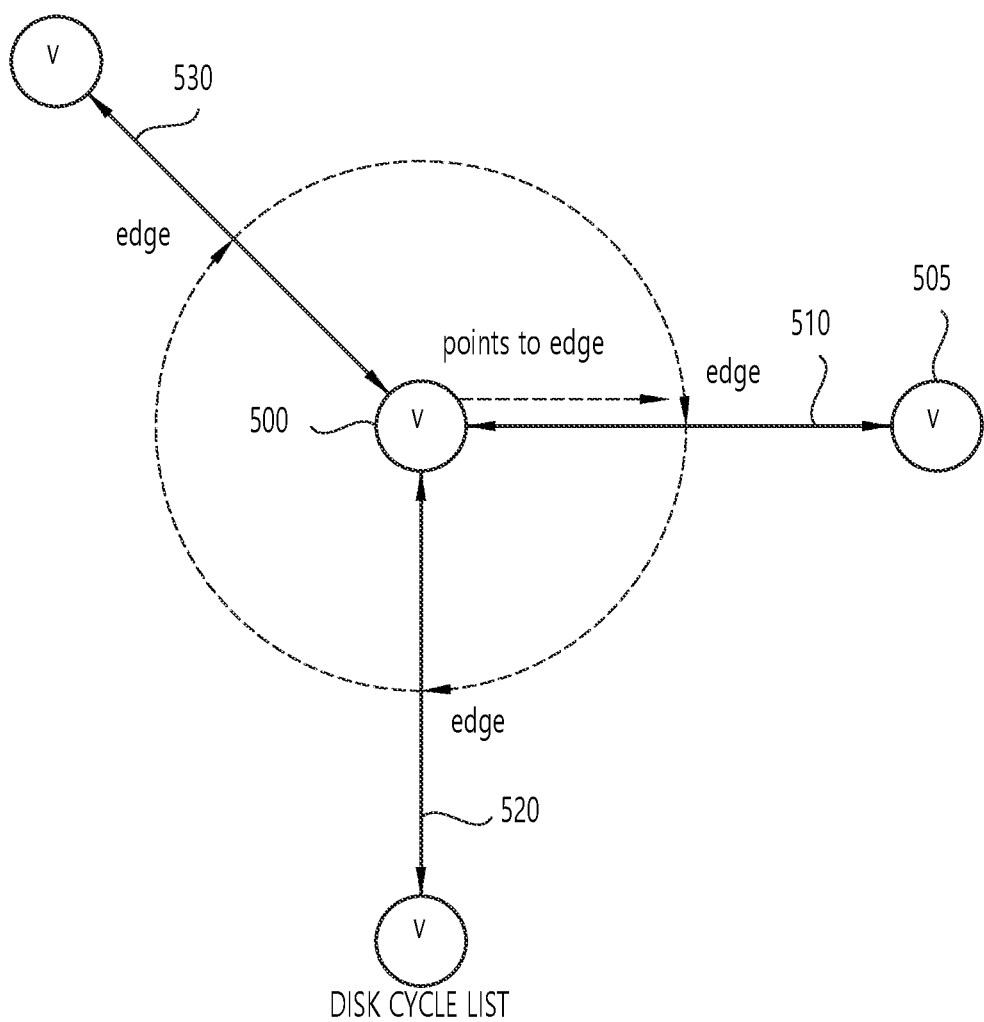
FIGS. 5A to 5C are conceptual diagrams illustrating a function of an EdMesh module according to an exemplary embodiment of the present invention.
Figure 5B:
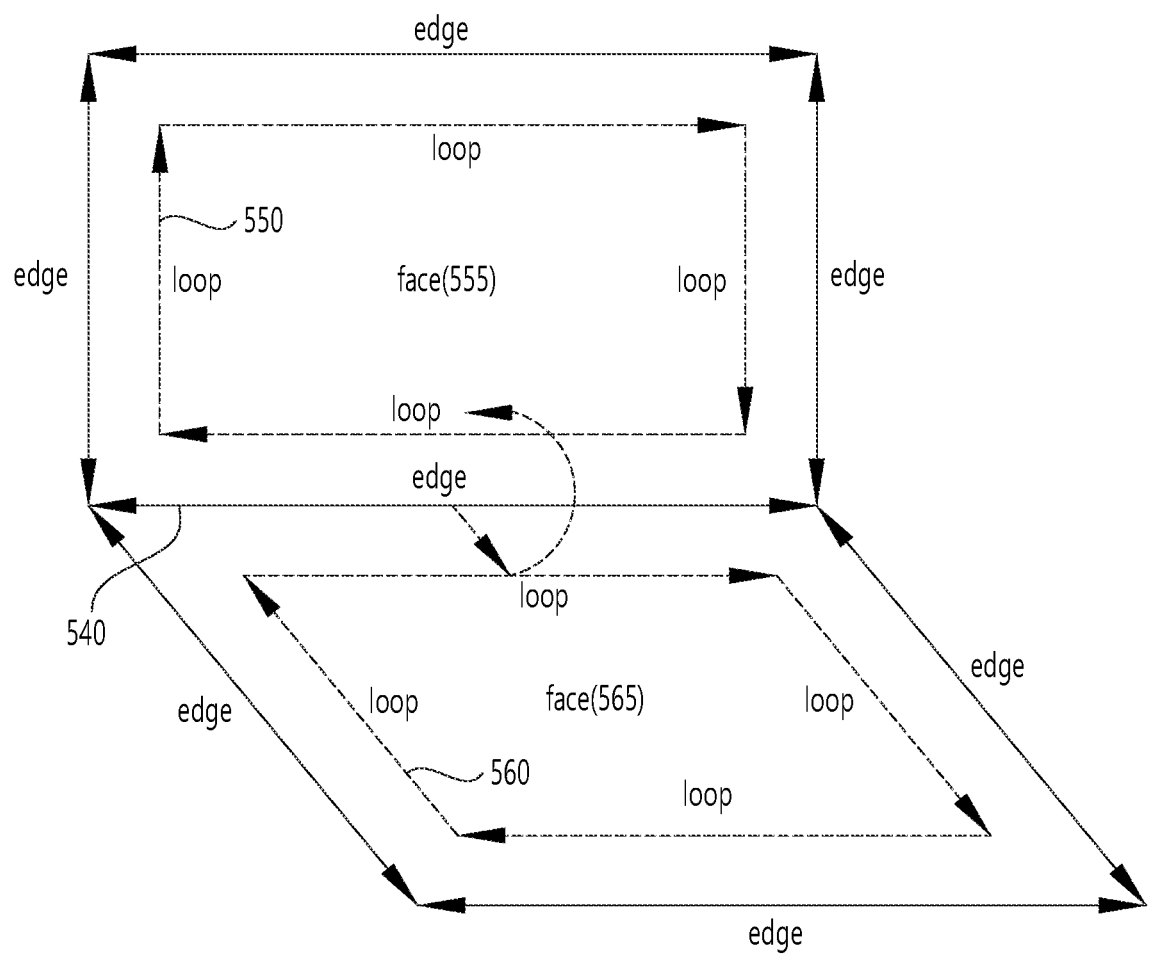
Figure 5C:
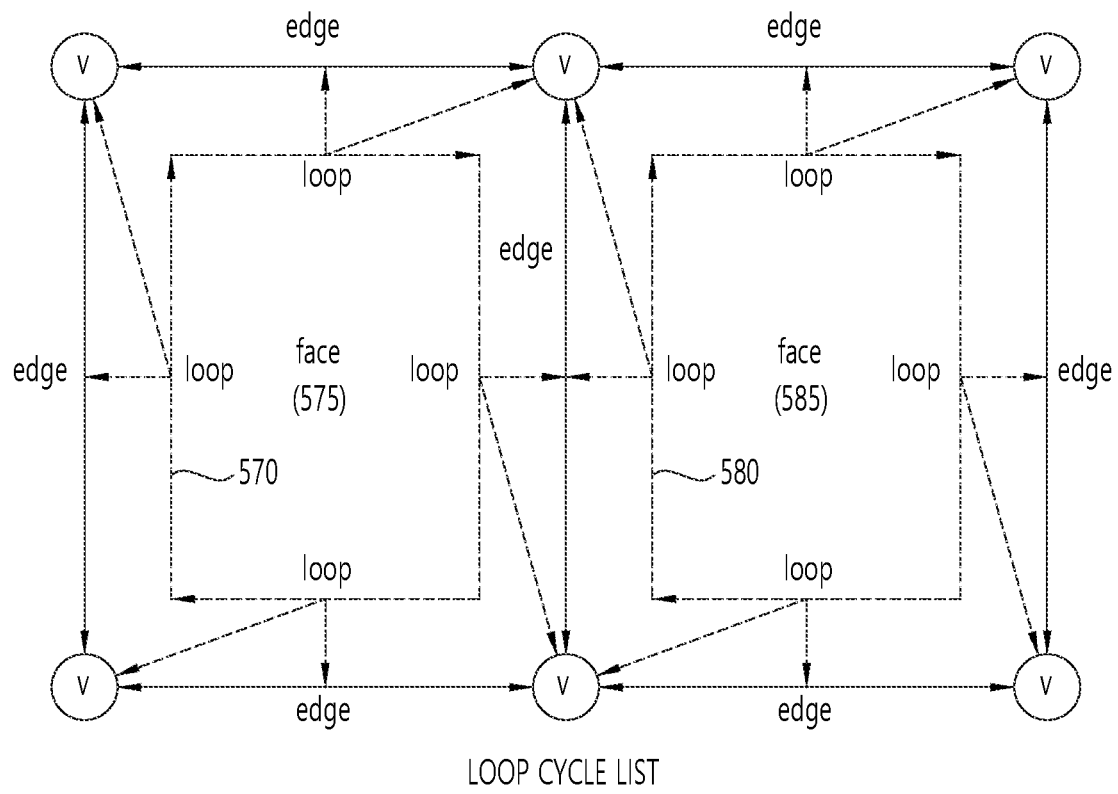

FIGS. 5A to 5C are conceptual diagrams illustrating a function of an EdMesh module according to an exemplary embodiment of the present invention.

FIGS. 5A to 5C show editable connective cycle mesh structures in EdMeshes.

Referring to FIGS. 5A to 5C, a connective cycle mesh structure may be used for rapidly searching for connection information of vertices, edges, and faces in an EdMesh module.

FIG. 5A shows a disk cycle list.

The disk cycle list is a list for circulating around all edges connected to vertices.

A vertex has the edge ID of one of edges that have the vertex as a start point or an end point. Beginning with the edge corresponding to the edge ID that the vertex has, all the edges connected to the vertex may be circulated around. Information on the positions of vertices is stored in a separate array of a vertex memory pool.

An edge has information on the IDs of two vertices constituting the edge and the IDs of a previous edge and a next edge which are included in a disk cycle list of each of the two vertices.

In other words, when a first vertex 500 is selected, information on the ID of a first edge 510, which is an edge having the first vertex 500 as a start point or an end point, is searched for. The detected first edge 510 may be mapped to information on the IDs of two vertices 500 and 505 constituting the first edge 510 and the IDs of a previous edge and a next edge which are included in a disk cycle list of each of the two vertices 500 and 505. Accordingly, a second edge 520 may be searched for on the basis of the ID of a next edge (e.g., the ID of the second edge 520) which is included in the disk cycle list together with the first edge 510.

After the second edge 520 is found, a third edge 530 may be searched for on the basis of the ID of a next edge (e.g., the ID of the third edge 530) which is included in the disk cycle list together with the second edge 520. In this way, all edges connected to a vertex may be circulated around in order of a first edge, a second edge, . . . , and an $n^{th}$ edge.

FIG. 5B is a radial cycle list.

A radial cycle list is a list for circulating around all faces including edges.

As described above, an edge may have the IDs of two vertices constituting the edge and the IDs of a previous edge and a next edge which are included in a disk cycle list of each of the two vertices. Also, an edge 540 may have information on loop IDs related to loops 550 and 560 connected to the edge 540.

The loops 550 and 560 may have information on a previous loop ID and a next loop ID in a radial cycle list for circulating around faces 555 and 565 which include the edge 540 indicated by the loops 550 and 560.

Accordingly, when the single edge 540 is selected, information on the loops 550 and 560 connected to the edge can be acquired. In other words, it is possible to circulate around all the faces 555 and 565 including the single edge 540 on the basis of the radial cycle list and acquire information on all the faces 555 and 565 including the single edge 540.

The order of circulating around edges in a disk cycle list and the order of circulating around faces in a radial cycle list may not be determined. A fixed rule may not exist as shown in FIG. 5B which is a case of circulating around a closer face first clockwise or counterclockwise.

FIG. 5C is a loop cycle list.

A loop cycle list is a list for circulating around loops 570 and 580 constituting faces 575 and 585. Each of the loops 570 and 580 may reference an adjacent loop with directionality and also reference vertices and edges corresponding to the loop 570 or 580. When the loops 570 and 580 are sequentially circulated around, vertices and edges constituting the faces 575 and 585 may also be sequentially circulated around.

The loops 570 and 580 may have the IDs of the faces 575 and 585 to which the loops 570 and 580 belong and the IDs of the vertices and edges indicated by the loops 570 and 580. Also, the loops 570 and 580 may have additional loop ID information for a radial cycle list and a loop cycle list.

Specifically, the loops 570 and 580 may have a previous loop ID and a next loop ID of a radial cycle list for circulating around a face including edges indicated by the loops 570 and 580, respectively. Also, the loops 570 and 580 may have a previous loop ID and a next loop ID of a loop cycle list for sequentially circulating around edges and vertices constituting the faces 575 and 585, respectively.

According to the present invention, it is possible to rapidly search for connection information of vertices, edges, and faces on the basis of such a disk cycle list, radial cycle list, and loop cycle list.

Figure 6:
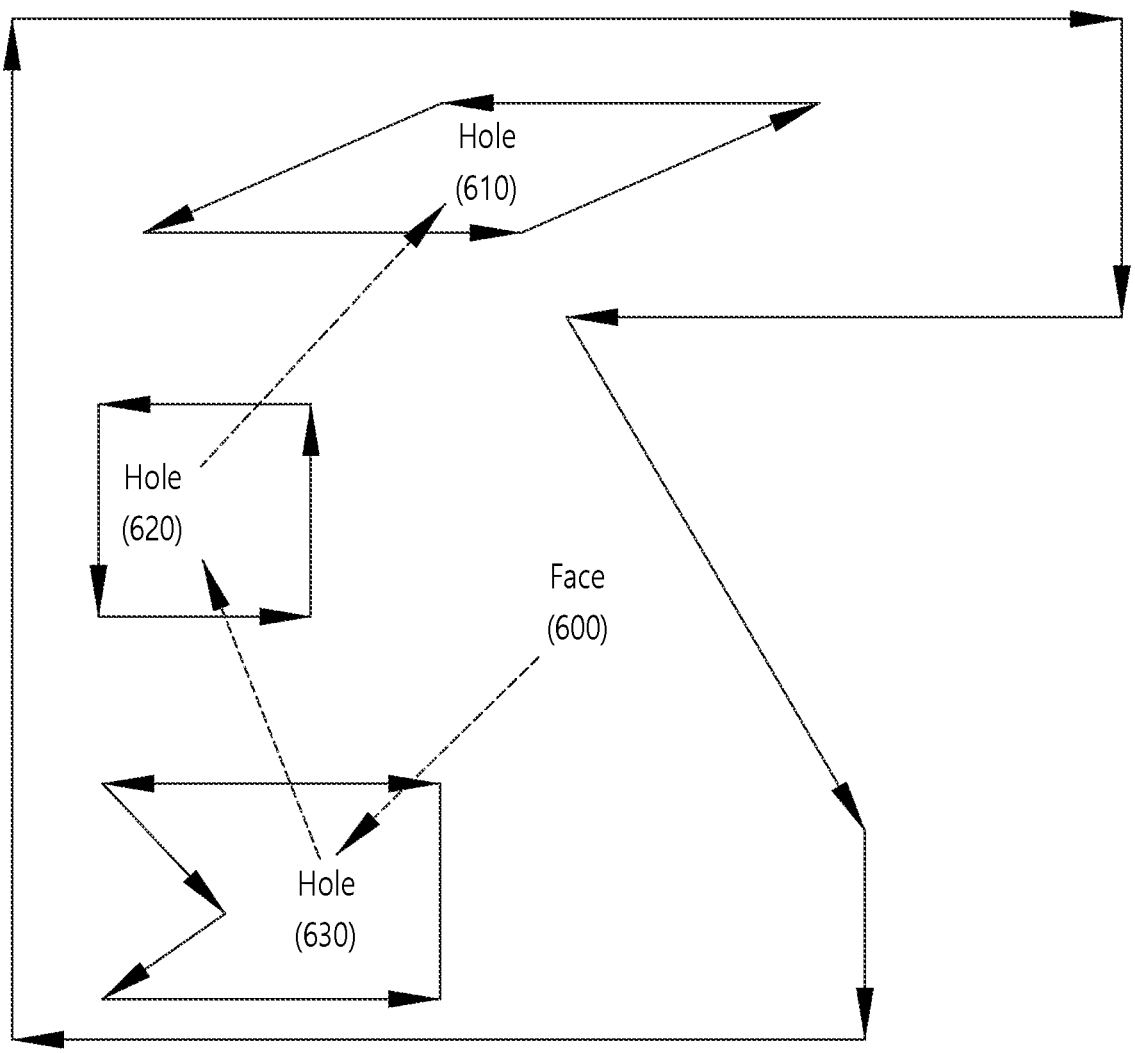
FIG. 6 is a conceptual diagram illustrating a function of an EdMesh module according to an exemplary embodiment of the present invention.

FIG. 6 is a conceptual diagram illustrating a function of an EdMesh module according to an exemplary embodiment of the present invention.

FIG. 6 shows a data structure for representing a face with holes in an EdMesh.

Referring to FIG. 6, a face on an EdMesh may basically have a hole. According to the present invention, there is a separate memory pool for managing holes in faces, and a unique hole ID may be allocated to each of the holes in the faces. A hole in a face may be accessed through the hole ID. A hole in a face may also have a simple polygonal shape and may be represented in a loop cycle list data structure like a face.

A first hole 610, a second hole 620, and a third hole 630 may be positioned in one face 600, and a hole ID may be allocated to each of the first hole 610, the second hole 620, and the third hole 630.

Each of the first hole 610, the second hole 620, and the third hole 630 may be represented as the above-described loop cycle list. A loop corresponding to each of the first hole 610, the second hole 620, and the third hole 630 may reference a loop of an adjacent hole with directionality and also reference vertices and edges corresponding to the loop. When loops corresponding to the holes in the face are sequentially circulated around, information on the holes in the face may be represented.

Figure 7:
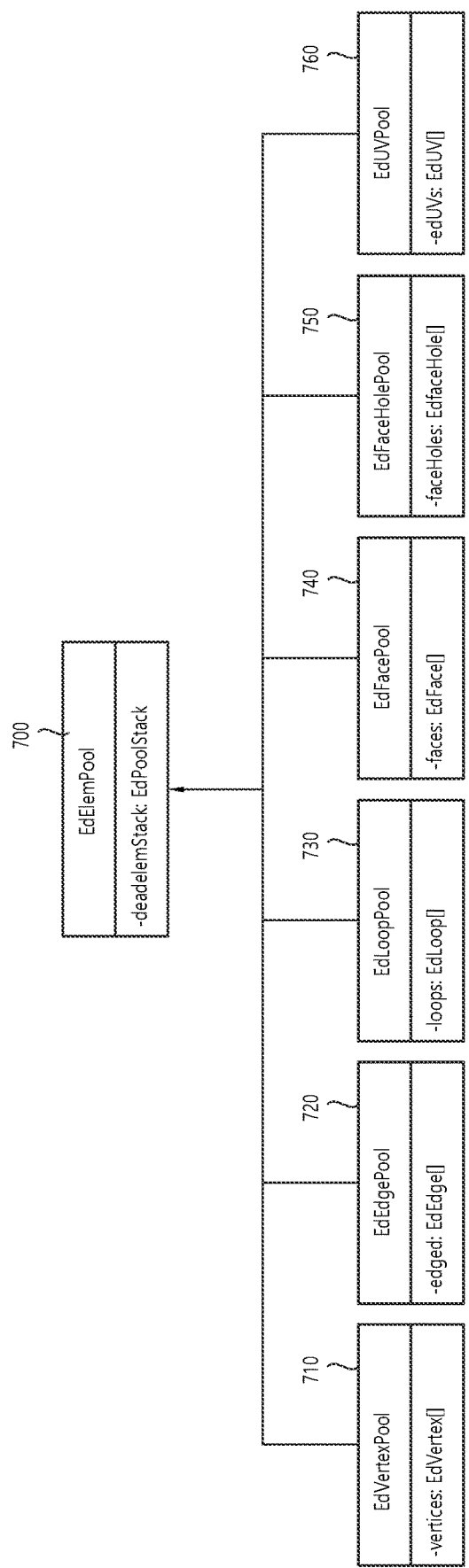
FIG. 7 is a conceptual diagram illustrating a memory pool for managing elements of EdMeshes according to an exemplary embodiment of the present invention.

FIG. 7 is a conceptual diagram illustrating a memory pool for managing elements of EdMeshes according to an exemplary embodiment of the present invention.

FIG. 7 shows an inheritance relationship between structures in a memory pool.

Referring to FIG. 7, information on vertices, edges, and faces which are elements of an EdMesh is managed in memory pools, and IDs are issued. The memory pools may include EdVertexPool, EdEdgePool, EdLoopPool, EdFacePool, EdFaceHolePool, and EdUVPool.

All the memory pools inherit from EdElemPool and allow issuing, removal, and reference of new element IDs at a constant time.

The memory pools have an element structure array. Element structures have the ID of each element in common, and the ID corresponds to an index of the array. Accordingly, an element may be referenced at a constant time on the basis of the ID.

Each memory pool may inherit from EdElemPool and manage element structures as an array.

Figure 8:
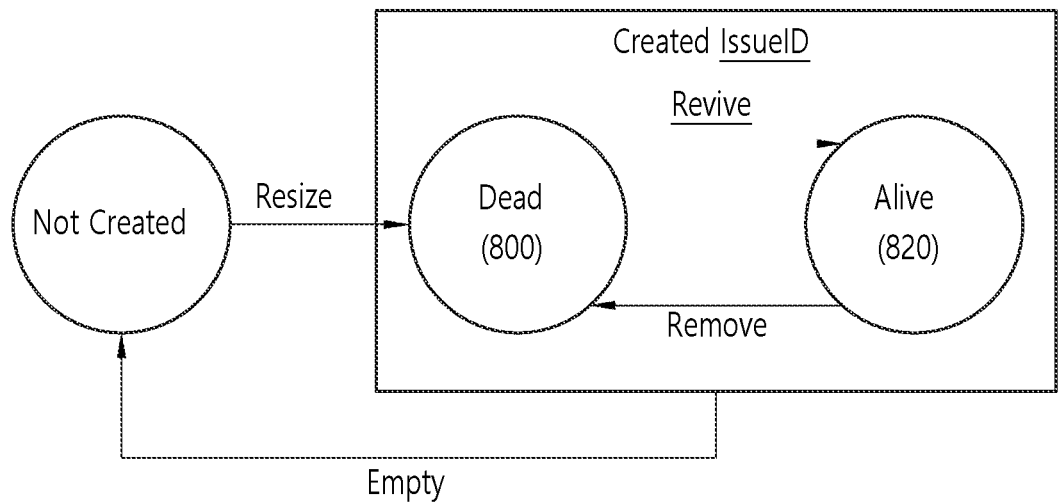
FIG. 8 is a conceptual diagram illustrating a state change of an element of an EdMesh according to an exemplary embodiment of the present invention.

FIG. 8 is a conceptual diagram illustrating a state change of an element of an EdMesh according to an exemplary embodiment of the present invention.

Referring to FIG. 8, when a memory pool is externally requested to issue an ID through EdElemPool.IssueID( ) method, it is first determined whether any element has been switched from an alive state to a dead state one or more times, and when there is such an element, the corresponding ID is returned.

First, when no element has been switched from the alive state to the dead state one or more times, indices of arrays corresponding to a portion of the capacity of all the arrays which has not been used yet are returned. When all the arrays are in use, the capacity of the arrays may be doubled, and then an ID may be returned.

Also, when the memory pool is externally requested to remove an element through EdElemPool.Remove( ) method, a requested ID is added to a stack that manages the indices of elements in the dead state, and a flag indicating that the element is alive is turned off. The element acquires a state through this process. The state of the element may be defined on the basis of whether the element is created and whether the generated element is dead or alive. Such a state varies depending on an external request, and state changes are made only in memory pools.

First, after an array is generated, an index of the array may be allocated as an index ID of a newly generated element (a vertex, an edge, a face, etc.) (Issue ID), and the element may be in the alive state.

Subsequently, when a specific element to which an ID is allocated is deleted during an operation, the element may be switched to the dead state through removal. In this case, an index ID of the array corresponding to the element switched to the dead state may be returned and reused as an index ID of another newly generated element.

Figure 9:
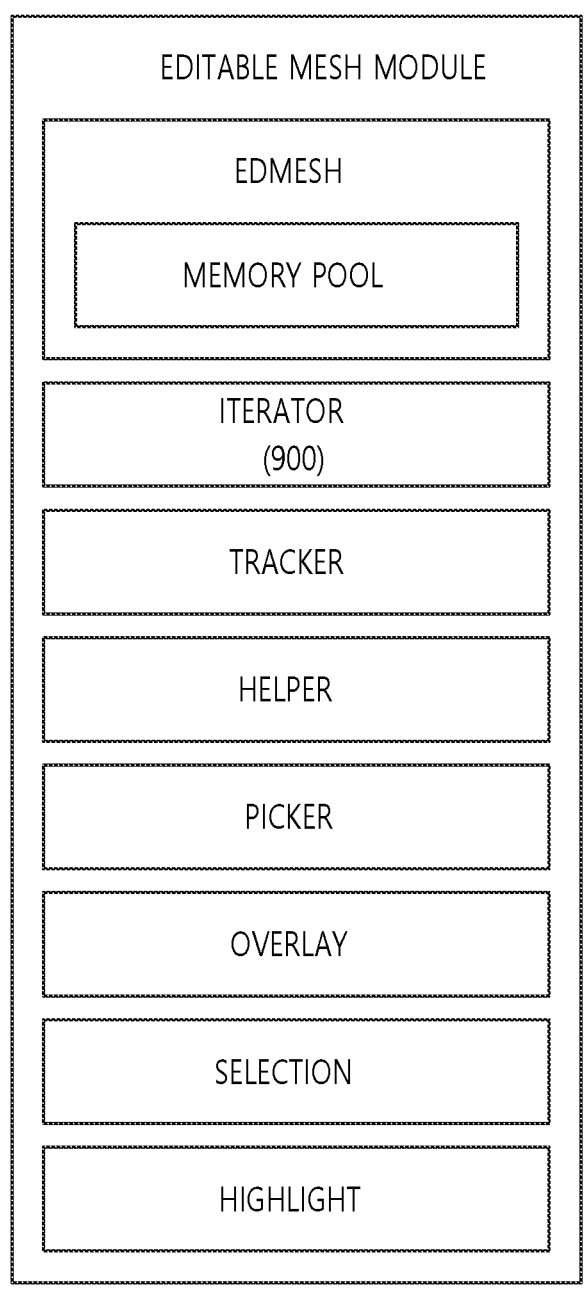
FIG. 9 illustrates operations of an EdMesh module according to an exemplary embodiment of the present invention.

FIG. 9 illustrates operations of an EdMesh module according to an exemplary embodiment of the present invention.

FIG. 9 shows functions of an iterator and a helper of an EdMesh module.

Referring to FIG. 9, functions of the iterator of the EdMesh module are shown.

The iterator may be used in the EdMesh module to easily circulate through the above-described disk cycle list, radial cycle list, and loop cycle list. Due to the iterator, a list may be circulated through without exposing the data structure of an EdMesh. When the iterator is not used, a do{ }while( ) statement is used in accessing a memory pool of the EdMesh module, and thus the code is complicated.

For example, an iterate called RadialFaceIter may be used as shown below to circulate around all faces including an edge.

Example Code 1

```
foreach (var faceID in new RadialFaceIter(GetEdMesh( ),
  edge.GetID( )))
{ Debug.Log($"FaceID : {faceID}");
  Functions of the helper of the EdMesh module will be disclosed below.
```

As described above, vertices, edges, faces, and loops of an EdMesh may be referenced through a memory pool of the EdMesh. However, accessing an element every time in this way results in a lengthy code and degrades readability accordingly.

To overcome this shortcoming, according to the present invention, a helper structure may be allocated to each element. When an instance, which is generated by giving an EdMesh pointer and an element ID to a helper structure generator as factors, is used, it is possible to easily handle elements of the EdMesh. Since the instance generated by giving the EdMesh pointer and the element ID as factors is stored not in a heap but in a stack, there is no burden of memory allocation or release.

According to the present invention, a helper structure corresponding to vertices, edges, faces, and loops may be declared as follows.

```
EdVertexHelper
EdEdgeHelper
EdLoopHelper
EdFaceHelper
```

For example, code for setting a position at the vertex of a specific ID using a helper, obtaining an edge ID, and then counting the number of edges connected to the next vertex may be written as follows.

Example Code 2

```
/// generate a vertex helper instance.
var vertex = new EdVertexHelper(GetEdMesh( ), vertexID);
/// 1) set currentPos at a vertex indicated by vertexID
vertex.Pos = currentPos;
/// 2) bring the IDs of edges connected to the vertex indicated by vertexID
var edgeID = vertex.EdgeID;
/// 3) count the number of edges connected to the vertex indicated by vertexID
var EdgeCount = vertex.CountConnectedEdges( );
In this way, processing is allowed on the basis of a helper without a duplicate use of vertextID or GetEdMesh( ).
```

Figure 10:
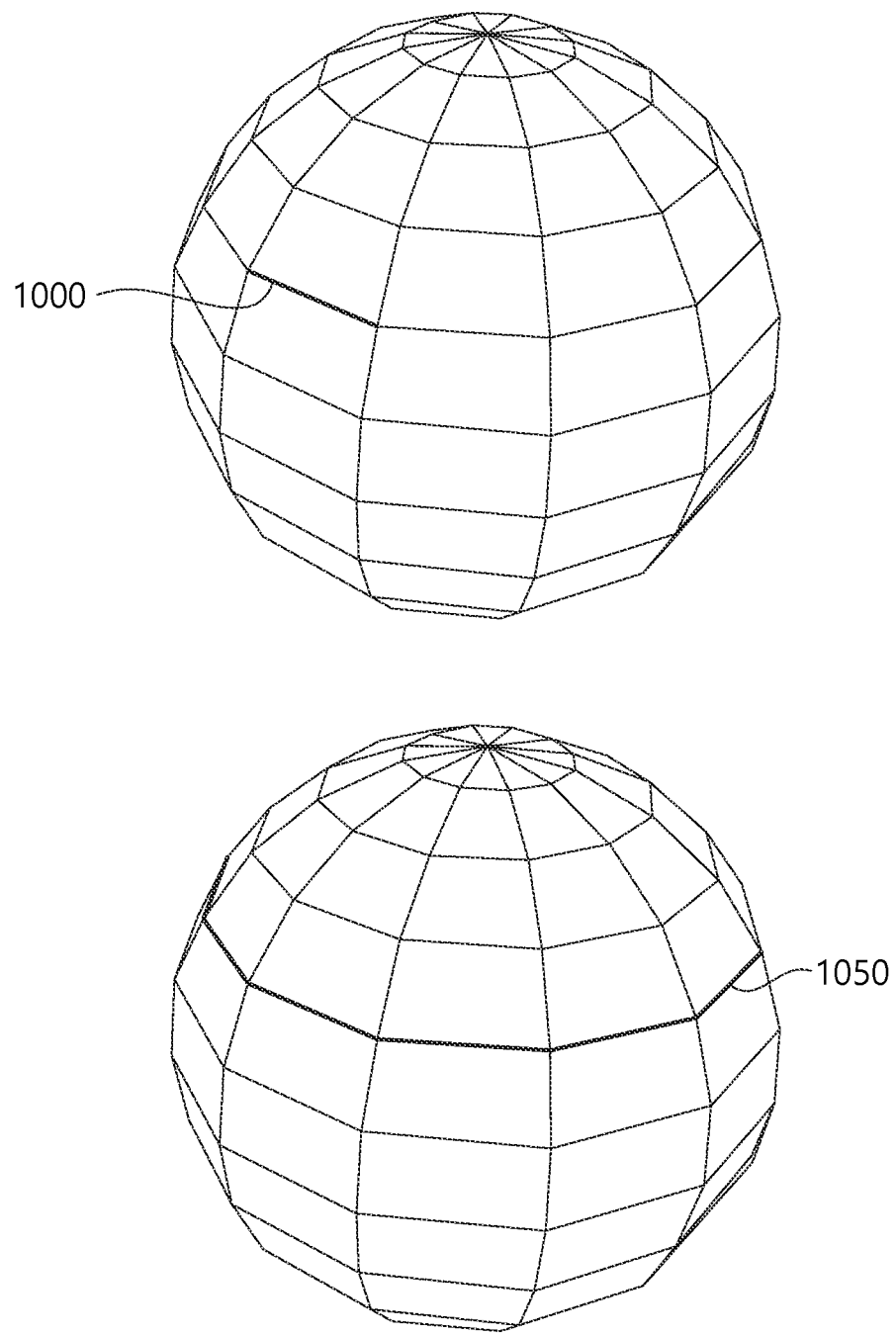
FIG. 10 illustrates an operation of an EdMesh module according to an exemplary embodiment of the present invention.

FIG. 10 illustrates an operation of an EdMesh module according to an exemplary embodiment of the present invention.

FIG. 10 shows a function of a tracker of an EdMesh module.

Referring to FIG. 10, while an iterator circulates around elements of an EdMesh using neighborhood information of the elements, a tracker sequentially returns elements of a course generated through a unique algorithm like tracking.

Some functions for the tracker may be redefined.

MoveNext method, the body code of TrackerIterator which is the uppermost class of the tracker, may be defined on the basis of the following function.

Example Code 3

```
public bool MoveNext( )
{
var ret = FirstStep( );
if (ret == FirstStepRetType.ReturnTrue) {
return true;
}
else if (ret == FirstStepRetType.ReturnFalse)
{
return false;
}
StepForward( ); return CanStepForward( );
}
```

FirstStep( ) is a first step and sets the first element of tracking when the first element is necessary in the corresponding function. Once FirstStep( ) function is called, FirstStepRetType.Pass may be returned.

StepForward( ) is a function for bringing a next element by running a tracking algorithm.

CanStepForward( ) is a function for checking whether it is possible to move on to a next element. When it is not possible to move on to a next element, all courses have been undergone, and thus the tracking is finished.

When an edge loop select tool is selected with one edge selected as shown in the drawing, EdgeLoopTracker operates, and all edges in the loop may be selected.

At this time, an iterator using EdgeLoopTracker operates as shown in the following code, and the edges in the loop are returned one by one.

Example Code 4

```
foreach (var loopEdgeID in new EdgeLoopTracker(GetEdMesh( ), edgeID))
{
selectedEdgeIDs.Add(loopEdgeID);
}
```

In the present invention, the following trackers may be defined and used.

EdgeLoopTracker: circulates around edges in an edge loop.

EdgeRingTracker: circulates around edges in a ring form.

EdgeGrowTracker: circulates around edges adjacent to a selected edge.

FaceGrowTracker: circulates around faces adjacent to a selected face.

VertexGrowTracker: circulates around vertices adjacent to a selected vertex.

Figure 11:
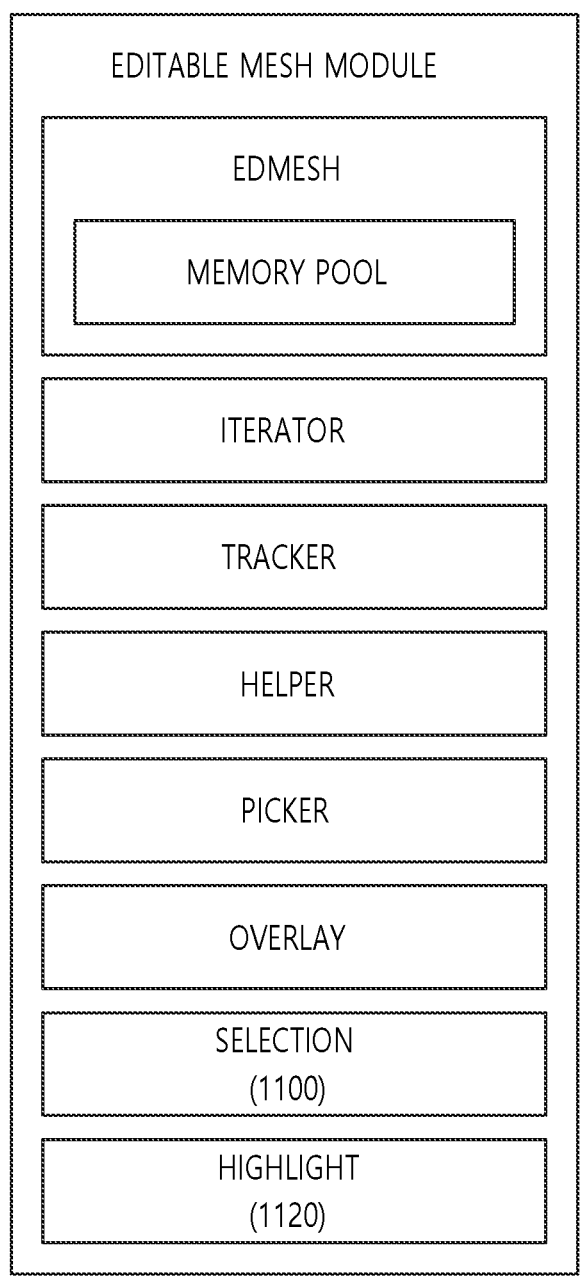
FIG. 11 illustrates an operation of an EdMesh module according to an exemplary embodiment of the present invention.

FIG. 11 illustrates an operation of an EdMesh module according to an exemplary embodiment of the present invention.

FIG. 11 shows selection and highlight functions of an EdMesh module.

Referring to FIG. 11, a selection module for efficiently managing a selected element and a highlight module for managing an element indicated by a cursor are shown.

In a renderableFlags variable of each element, whether the element is selected and whether the element is highlighted are stored.

Example Code 5

```
public enum EEdRenderableFlag
{
/// <summary>
/// no flag
/// </summary>
None = 0,
/// <summary>
/// whether an element is selected
/// </summary> Selected = 1 << 0
/// <summary>
/// whether an element is highlighted because it is under a mouse cursor
/// </summary>
Highlighted = 1 << 1,
/// <summary>
/// whether a face is triangulated by an additional triangulation algorithm
/// </summary> Poly2Tri = 1 << 2
}
```

Therefore, by simply checking the renderable flag of an element, it is possible to determine whether the element is selected and whether the element is highlighted. However, in order to determine which element is currently selected in an EdMesh and which element is currently highlighted, it is necessary to circulate around all elements, which is an operation of a considerable load in a high-capacity mesh.

Accordingly, in the present invention, a class for only managing a selected element and a highlighted element may be separately defined as follows.

EdElemSelection: manages a selected element
EdElemHighlight: manages a highlighted element Example Code 6

```
public class EdElemSelection : UMXResource,
ISerializationCallbackReceiver
{
private readonly HashSet<ElemIDType> vertexIDs = new
HashSet<ElemIDType>( );
private readonly HashSet<ElemIDType> edgeIDs = new
HashSet<ElemIDType>( );
private readonly HashSet<ElemIDType> faceIDs = new
HashSet<ElemIDType>( );
... ... ... }
```

As shown in Example code 6, vertex, edge, and face IDs are managed using HashSets to prevent storage of overlapping IDs. By simply circulating around these HashSets, a selected element may be picked out, and selection and non-selection actions may be taken through the class. Accordingly, it is unnecessary to directly access renderableFlags.

Example Code 7

```
public class EdElemHighlight : UMXResource
{
private ElemIDType vertextID = -1;
private ElemIDType edgeID = -1;
private ElemIDType faceID = -1;
... ... ... }
```

There is only one element to be highlighted. Accordingly, EdElemHighlight class has a variable for storing element-specific IDs. Also, EdElemHighlight class includes a highlighting and dehighlighting method and thus may manage whether to highlight an element without directly accessing the variables of renderableFlags.

According to the present invention, it is possible to provide a 3D modeling tool that is optimized for real-time rendering content creation on the basis of effective 3D modeling data.

Also, according to the present invention, it is possible to provide a 3D modeling tool that can solve, through effective 3D modeling data management, the problem of data export and import caused when an external modeling tool is used and can enable anyone to easily perform low polygon modeling up to high polygon modeling in a game engine.

The effects of the present application are not limited to the above-described effects, and effects not described may be clearly understood by those of ordinary skill in the art from the present specification and the accompanying drawings.

While the invention has been shown and described with respect to particulars, such as specific components, embodiments, and drawings, the embodiments are used to aid in the understanding of the present invention rather than limiting the present invention, and those skilled in the art should appreciate that various changes and modifications are possible without departing from the spirit and scope of the invention.

Therefore, the spirit of the present invention is not defined by the above embodiments but by the appended claims of the present invention, and the scope of the present invention is to cover not only the following claims but also all modifications and equivalents derived from the claims.

What is claimed is:

1. A method of managing modeling data during three-dimensional (3D) modeling, the method comprising:
   generating, by an editable mesh module, a data search list; and
   searching, by the editable mesh module, for connection information of vertices, edges, and faces of a 3D model on the basis of the data search list, wherein the data search list includes a loop cycle list, the loop cycle list being a list for circulating around the loops constituting the faces, each loop referencing an adjacent loop with directionality and vertices and edges corresponding to the loop, each loop containing information on identifiers (IDs) and directionalities of the faces, each loop containing information on IDs of the vertices and edges, and when the loops are sequentially circulated around, vertices and edges constituting the faces are sequentially circulated around.

2. The method of claim 1, wherein the data search list includes a disk cycle list or a radial cycle list,
   the disk cycle list is a list for circulating around the edges connected to the vertex, and
   the radial cycle list is a list for circulating around the faces including the edge.

3. The method of claim 2, wherein the editable mesh module manages at least one hole in the face on the editable mesh in a data structure of the loop cycle list,
   a loop corresponding to each of the at least one hole references a loop of an adjacent hole with directionality, and
   when the loop corresponding to each of the at least one hole in the face is sequentially circulated around, information on the at least one hole in the face is represented.

4. A three-dimensional (3D) modeling engine for managing modeling data during 3D modeling, the 3D modeling engine comprising:
   an editable mesh module configured to generate a data search list and search for connection information of vertices, edges, and faces of a 3D model on the basis of the data search list, wherein the data search list includes a loop cycle list, the loop cycle list being a list for circulating around the loops constituting the faces, each loop referencing an adjacent loop with directionality and vertices and edges corresponding to the loop, each loop containing information on identifiers (IDs) and directionalities of the faces, each loop containing information on IDs of the vertices and edges, and when the loops are sequentially circulated around, vertices and edges constituting the faces are sequentially circulated around; and
   a builder configured to divide an editable mesh into triangular faces and generate a renderable mesh.

5. The 3D modeling engine of claim 4, wherein the data search list includes a disk cycle list and a radial cycle list,
   the disk cycle list is a list for circulating around the edges connected to the vertex, and
   the radial cycle list is a list for circulating around the faces including the edge.

6. The 3D modeling engine of claim 5, wherein the editable mesh module manages at least one hole in the face on the editable mesh in a data structure of the loop cycle list, a loop corresponding to each of the at least one hole references a loop of an adjacent hole with directionality, and when the loop corresponding to each of the at least one hole in the face is sequentially circulated around, information on the at least one hole in the face is represented.

\* \* \* \* \*